US008833051B2

(12) United States Patent
Carroni et al.

(10) Patent No.: US 8,833,051 B2
(45) Date of Patent: Sep. 16, 2014

(54) METHOD FOR OPERATION OF AN INTEGRATED SOLAR COMBINED-CYCLE POWER STATION, AND A SOLAR COMBINED-CYCLE POWER STATION FOR CARRYING OUT THIS METHOD

(75) Inventors: Richard Carroni, Niederrohrdorf (CH); Camille Pedretti, Wettingen (CH); Thomas Dalla Piazza, Nidau (CH); Paul Pierre Antoine Drouvot, Village-Neuf (FR)

(73) Assignee: ALSTOM Technology Ltd, Baden (CH)

( * ) Notice: Subject to any disclaimer, the term of this patent is extended or adjusted under 35 U.S.C. 154(b) by 830 days.

(21) Appl. No.: 13/069,555

(22) Filed: Mar. 23, 2011

(65) Prior Publication Data
US 2011/0232295 A1   Sep. 29, 2011

(30) Foreign Application Priority Data

Mar. 26, 2010 (CH) .................................... 0448/10

(51) Int. Cl.
F02C 6/00 (2006.01)
F02G 1/00 (2006.01)
F02G 3/00 (2006.01)
F01K 13/02 (2006.01)
F01K 23/10 (2006.01)
F01K 3/24 (2006.01)
F01K 13/00 (2006.01)

(52) U.S. Cl.
CPC ............. F01K 23/101 (2013.01); Y02E 20/14 (2013.01); F01K 13/02 (2013.01); Y02E 10/46 (2013.01); F01K 3/24 (2013.01); Y02E 20/16 (2013.01); F01K 13/006 (2013.01)
USPC ........................ 60/39.182; 60/773; 60/641.8

(58) Field of Classification Search
USPC ..................... 60/39.182, 773, 641.8
See application file for complete search history.

(56) References Cited

U.S. PATENT DOCUMENTS 6,141,949 A * 11/2000 Steinmann ...................... 60/772
6,810,675 B2 * 11/2004 Liebig ............................. 60/773
(Continued)

FOREIGN PATENT DOCUMENTS

DE          10144841 B9    10/2004
DE      102008051384 B3     2/2010
(Continued)

OTHER PUBLICATIONS

Fraidenraich N. et al. "Optimization of Gas-Turbine Combined Cycles for Solar Energy and Alternative-Fuel Power Generation" Solar Energy, Pergamon Press (Oxford, GB) Bd. 48, Nr. 5, Jan. 1, 1992 (pp. 301-307) XP000267248.

(Continued)

Primary Examiner — Craig Kim

(57) ABSTRACT

A method is provided for operation of an integrated solar combined-cycle power station. The power station includes a water/steam circuit having a steam turbine and a heat recovery steam generator through which hot exhaust gases from a gas turbine flow. The water/steam circuit is additionally supplied with heat from a solar array. In such a method, an optimum cost-benefit relationship is achieved in that the water/steam circuit is designed only for the full load on the gas turbine, and in that, when feeding additional power from the solar array into the water/steam circuit, the load on the gas turbine is reduced, on the basis of the power additionally fed in from the solar array, to such an extent that the total output power of the integrated solar combined-cycle power station remains substantially constant.

10 Claims, 3 Drawing Sheets

(56) References Cited

U.S. PATENT DOCUMENTS

| | | | |
|---|---|---|---|
| 7,640,746 B2 * | 1/2010 | Skowronski et al. | 60/641.8 |
| 2006/0174622 A1 | 8/2006 | Skowronski | |
| 2006/0260314 A1 | 11/2006 | Kincaid et al. | |
| 2008/0127647 A1 | 6/2008 | Leitner | |
| 2010/0162700 A1 * | 7/2010 | Birnbaum et al. | 60/641.8 |

FOREIGN PATENT DOCUMENTS

| | | | |
|---|---|---|---|
| GB | 2449181 A | * | 11/2008 |
| WO | 9511371 A1 | | 4/1995 |

OTHER PUBLICATIONS

Rheinlander et al. "GuD-Kraftwerk mit integriertem Solarsystem" BWK Brennstoff Warme Kraft, Springer VDI, Verlag, Dusseldorf, Germany Bd. 53, Nr. 6, Jun. 1, 2001 (pp. 55-58) XP001065946.

Dersch et al. "Trough Integration into Power Plants" Energy, vol. 29, 2004 (pp. 947-959).

Hosseini et al. "Technical & economic assessment of the ISCC power plants in Iran" Renewable Energy, vol. 30, 2005 (pp. 1541-1555).

\* cited by examiner

METHOD FOR OPERATION OF AN INTEGRATED SOLAR COMBINED-CYCLE POWER STATION, AND A SOLAR COMBINED-CYCLE POWER STATION FOR CARRYING OUT THIS METHOD

FIELD OF INVENTION

The present invention relates to the field of power-station technology. It relates in particular to a method for operation of an integrated solar combined-cycle power station having a water/steam circuit and a solar array, wherein the water/steam circuit comprises a steam turbine and a heat recovery steam generator, and heat is additionally supplied to the water/steam circuit from a solar array. The invention also relates in particular to a solar combined-cycle power station for carrying out the method.

BACKGROUND

The integration of power produced by solar means in combined-cycle power stations with a gas turbine and a water/steam circuit to form an integrated solar combined-cycle (ISCC) power station makes it possible to reduce $CO_2$ emissions from such power-station facilities. Solar-thermal solutions are in this case—in contrast to photovoltaic technologies—particularly highly suitable for such integration. Solutions such as these are distinguished in that the solar energy is used in order to generate steam (so-called solar steam) directly or indirectly, and this can be used in various ways in a combined-cycle circuit with a gas turbine. One preferred form is for the solar steam to be added to the water/steam circuit (WSC), instead of using it in the gas turbine itself. Furthermore, the solar steam is preferably generated in solar arrays which are fitted with parabolic groove collectors.

FIG. 1 shows a highly simplified example of a power station layout of such an integrated solar combined-cycle power station. The integrated solar combined-cycle power station 10 shown in FIG. 1 comprises a gas turbine 11 with sequential combustion, a water/steam circuit 20 with a steam turbine 21, and a solar circuit 30 with a solar array 33. In the present example, the gas turbine 11 consists of two compressors 13a, 13b which are connected one behind the other, that compress the combustion air sucked in via an air inlet 12, and pass it to a first combustion chamber 14, for burning a fuel. The hot gas that is produced is expanded in a first turbine 15, producing useful power, is heated once again in a second combustion chamber 16, and is passed through a second turbine 17. The compressors 13a, 13b and the turbines 15, 17 are connected to a generator 19 via a shaft 18.

The exhaust gas which emerges from the second turbine 17 and is still hot is passed through a heat recovery steam generator (HRSG) 26, where it generates steam for the water/steam circuit 20 which includes the heat recovery steam generator 26. After flowing through the heat recovery steam generator 26, the exhaust gas flows to the outside via an exhaust gas line through an exhaust gas chimney 27. Fundamentally, the water/steam circuit 20 is formed from the steam turbine 21 which is connected to a generator 25, a condenser 22, a feedwater boiler 24, a feedwater pump 23 and the heat recovery steam generator 26.

Thermal energy is additionally supplied to the water/steam circuit 20 from the solar circuit 30, which is formed from the solar array 33 with the parabolic groove collectors 37, a pump 31 and a heat exchanger 32. Storage means for storage of solar heat for operation during periods when there is little or no sun can, of course, additionally be associated with the solar circuit 30. It is likewise feasible to use collectors equipped with Fresnel mirrors or heliostat installations instead of the parabolic groove collectors 37. The solar heat can be introduced into the water/steam circuit 20 at various points; therefore, as the representative of various solutions, FIG. 1 shows only one connection 28 as a double-headed arrow between the heat exchanger 32 and the heat recovery steam generator 26.

Previous investigations and studies have confirmed that integrated solid combined-cycle power stations such as these are both technically and economically feasible and worthwhile, and are suitable for the use of solar energy, not least because use can be made of proven technologies. In fact, integrated solar combined-cycle power stations have a number of advantages, which are listed below.

For a combined-cycle KA26 type power station from the Assignee of the present application, which is based on the use of GT26-type gas turbines, the overall efficiency can be increased from approximately 57% to approximately 65%, with the contribution of the solar energy being only approximately 15%. The $CO_2$ emissions are thus drastically reduced.

Components which already exist in conventional combined-cycle power stations (CCPSs) can largely be used for utilization with solar steam, thus considerably reducing the cost of electricity (CoE) in an integrated solar combined-cycle (ISCC) power station in comparison to pure solar power stations (from, for example, €300/MWh to €180/MWh in the case of an ISCC).

Large amounts of power from a reliable supply can be generated 24 hours a day and 7 days a week, independently of the climatic conditions.

The power station starts to operate as soon as the solar array emits heat, as a result of which maximum use can be made of the solar energy.

A multiplicity of investigations and proposals have already been made in the prior art as to how the solar steam generated in a solar array can be integrated in a combined-cycle power station:

U.S. Patent Application Publication Nos. 2006/0260314 (A1) and 2006/0174622(A1) propose intermediate circuits in order to generate solar steam using the heat from a solar array.

Others investigate the economic and power aspects of the integration of parabolic groove solar arrays in a combined-cycle power station (Dersch et al., "Trough Integration into Power Plants", Energy, Vol. 29, pages 947-959, 2004).

It is also proposed that steam be produced from a solar array via an intermediate circuit and that supplementary firing (SF) be used, in order to regulate out the load changes (Hosseini et al., "Technical & economic assessment of the ISCC power plants in Iran", Renewable Energy, vol. 30, pages 1541-1555, 2005).

Publication No. WO95/11371(A1) also proposes the use of supplementary firing for adaption to load changes.

U.S. Patent Application Publication No. 2008/0127647 (A1), in particular, describes numerous options, referring back to previous proposals (see above), for the combination of solar combined-cycle power stations and combined-cycle power stations equipped with gas turbines. The aim is to maximize the solar component from the combined-cycle power station and to maximize the total output power by operating existing or retrofitted power stations, which are equipped with overdesigned heat recovery steam generators and steam turbines, with a high level of supplementary firing.

While the inclusion of solar steam in a combined-cycle power station undoubtedly represents a positive step in the direction of increasing the power output while at the same time reducing the $CO_2$ emissions per power unit, internal investigations have shown that the known solutions are not optimized in terms of effective fuel utilization (and therefore $CO_2$ avoidance) and economic parameters (electricity costs). However, these aspects are particularly important for acceptance and implementation of new technologies such as these, for example in the case of an integrated solar combined-cycle power station.

As already mentioned, the prior art is based on supplementary firing, in order to match the load on the power station and/or to increase the output power. However, supplementary firing involves combustion of additional fuel (for example by means of channel burners) in the heat recovery steam generator (supplementary firing 34 in FIG. 1), in order to produce additional steam for electricity generation by the steam turbine. While this undoubtedly increases both the output power and the flexibility of operation, thermodynamic considerations indicate that this reduces the overall efficiency of the power station (because the additional heat is produced at comparatively low temperatures). This means that neither the specific $CO_2$ emissions nor the fuel costs are minimized. The supplementary firing can admittedly increase the electricity generation by about 10%; however, at the same time, the specific output of $CO_2$ from a typical integrated solar combined-cycle power station is also increased by about 3% (350 $kgCO_2$/MW without supplementary firing, 360 $kgCO_2$/MW with supplementary firing).

The prior art postulates overdesigning of both the heat recovery steam generator (HRSG) and the steam turbine (by up to 50%), in order to make it possible to process the additional steam from the solar array and the supplementary firing. This results in higher investment costs. Furthermore, the overall efficiency decreases, when the power station is not being operated at full power (that is to say when the supplementary firing and/or the solar heat do(es) not reach the full 100%), because operation does not take place at the nominal operating point.

The aforementioned U.S. Patent Application Publication No. 2008/0127647(A1) in fact proposes the conversion of existing power stations, which already have a large extent of supplementary firing (15-50%) and use an overdesigned heat recovery steam generator and an overdesigned steam turbine (that is to say the heat recovery steam generator and the steam turbine are designed for operation with 100% exhaust gas heat from the gas turbine and, in addition, the solar heat and the supplementary firing).

FIG. 2 shows a diagram for this situation of the total electrical output power (total gross output in $MW_{el}$) plotted against the relative load on the gas turbine (GT Relative Load in %). A dashed line bounds the intended design space DS1. Although the power station must be designed for consumption of the peak power from the solar array (+110 MW) and supplementary firing (+110 MW)(operating point A' in FIG. 2), the power station (because of the change between day and night and changes in the atmospheric and weather conditions) will only rarely receive 100% solar heat. This design means that, whenever less than 100% solar heat is offered, the power station is overdesigned and is being operated away from the intended (optimum) operating point (that is to say between A' and C').

Although, in its own right, solar energy costs nothing, the equipment, the infrastructure, the land and the other requirements (for example the water for cleaning the mirrors in the solar array) for the use of solar energy are very expensive. Therefore, simply maximizing the solar system of an integrated solar combined-cycle power station does not necessarily represent an optimum solution in terms of the balance between environmental protection, performance and economic aspects. In the corresponding manner, the previously described power stations do not maximize efficiency while at the same time minimizing the economic and environmental costs, and therefore also do not exploit the full potential of solar energy. In fact, the previous solutions attempt only to maximize the solar component.

SUMMARY

The present disclosure is directed to a method for operating an integrated solar combined-cycle power station. The method includes providing a water/steam circuit having a steam turbine and a heat recovery steam generator through which hot exhaust gases from a gas turbine flow. The method also includes supplying the water/steam circuit with heat from a solar array, the water/steam circuit is designed only for a full load on the gas turbine. The method further includes reducing the load on the gas turbine when feeding additional power from the solar array into the water/steam circuit on the basis of the power additionally fed in from the solar array, to such an extent that the total output power of the integrated solar combined-cycle power station remains substantially constant.

The disclosure is also directed to an integrated solar combined-cycle power station including a water/steam circuit with a steam turbine and a heat recovery steam generator, through which hot exhaust gases from a gas turbine flow. Heat is additionally supplied to the water/steam circuit from a solar array, the water/steam circuit is designed only for a full load on the gas turbine. A controller is provided for the gas turbine, the controller controls the load on the gas-turbine on the basis of the power additionally fed in from the solar array, such that the total output power of the integrated solar combined-cycle power station remains substantially constant.

BRIEF DESCRIPTION OF THE DRAWINGS

The invention will be explained in more detail in the following text with reference to exemplary embodiments and in conjunction with the drawing, in which.

DETAILED DESCRIPTION OF THE PREFERRED EMBODIMENTS

Introduction to the Embodiments

Figure 1:
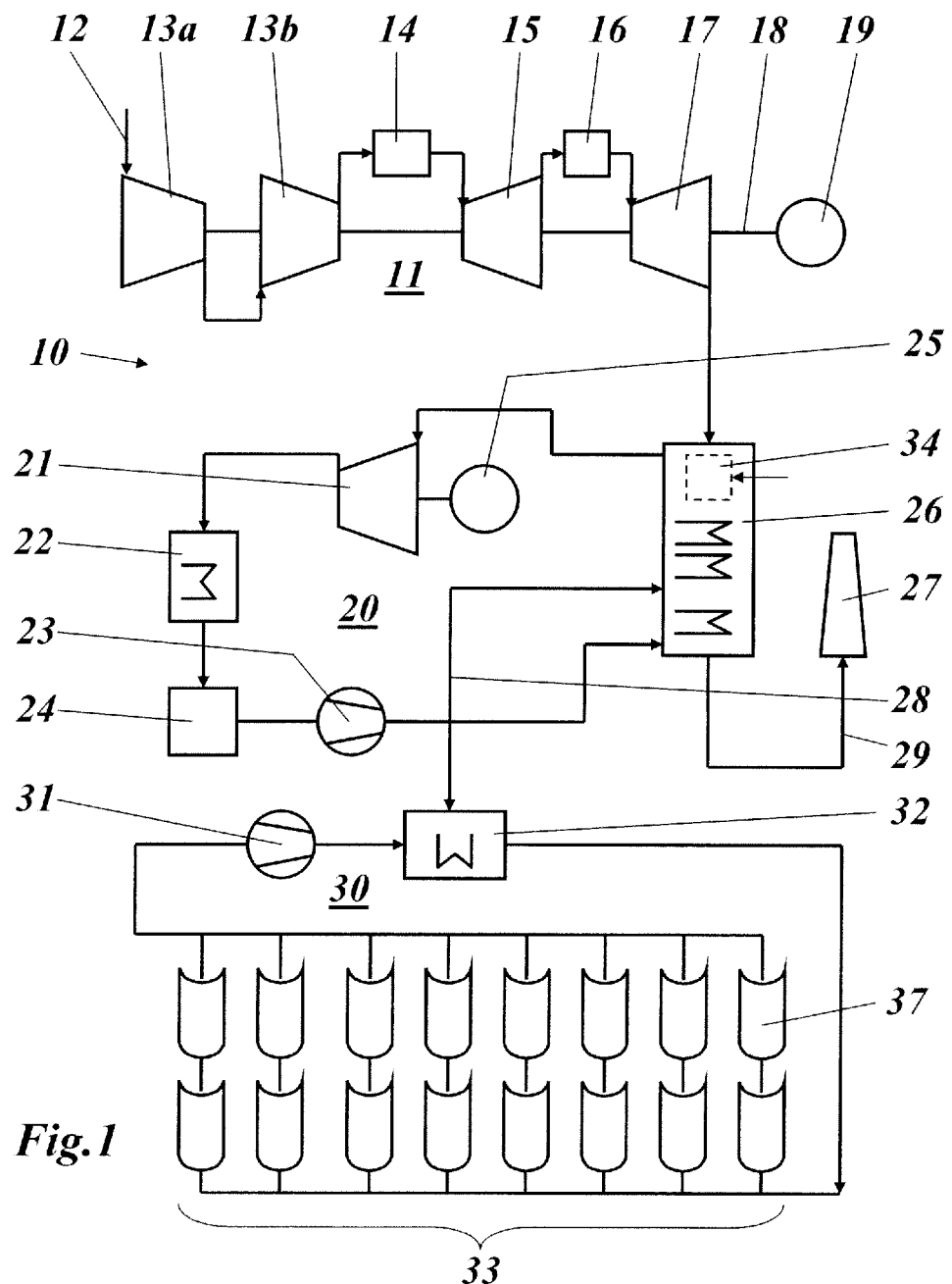
FIG. 1 shows the basic design of an integrated solar combined-cycle power station.
Figure 2:
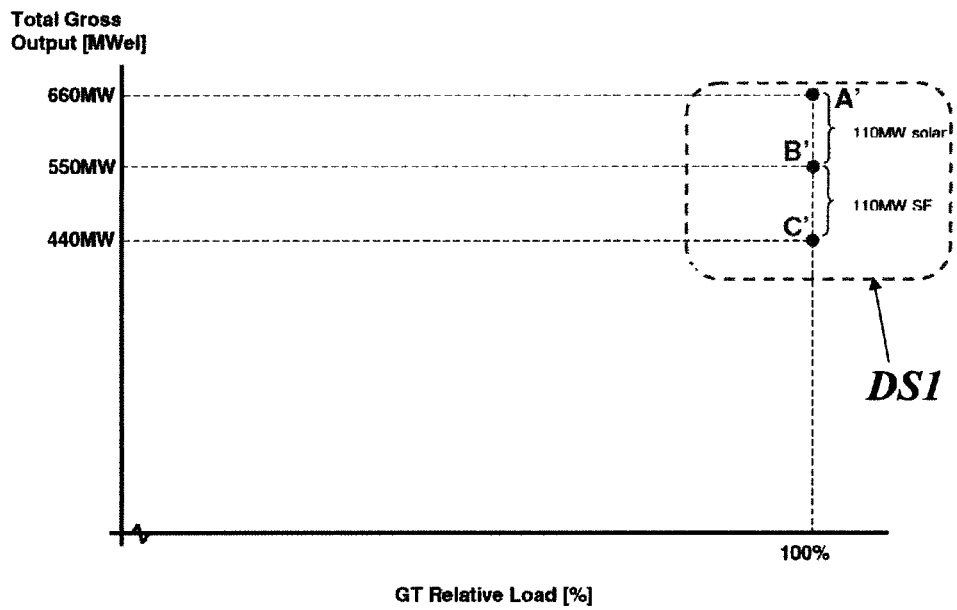
FIG. 2 uses a diagram of the output power of the integrated solar combined-cycle power station plotted against the load on the gas turbine to show the operating points and the design space for conventional power stations with supplementary firing.

The invention therefore has the object of specifying a method for operation of an integrated solar combined-cycle power station, which avoids the disadvantages of known methods and gives equal importance to economic, performance and environmental aspects, and specifies an integrated solar combined-cycle power station for carrying out the method.

The object is achieved by the totality of the features of claims 1 and 7. It is preferable for the method that the water/steam circuit is designed only for the full load on the gas turbine, and that, when feeding additional power from the solar array into the water/steam circuit, the load on the gas turbine is reduced, on the basis of the power additionally fed in from the solar array, to such an extent that the total output power of the integrated solar combined-cycle power station remains substantially constant.

In one refinement of the method of the present invention, when the integrated solar combined-cycle power station is being run down to partial load, the power additionally fed in from the solar array is maintained, and the load on the gas turbine is correspondingly reduced.

Preferably, the full load on the solar array is fed into the water/steam circuit, in which case a mean power which is available over the course of the day is advantageously drawn from the solar array as the full load on the solar array.

In another refinement of the method, supplementary firing is provided for steam generation in the water/steam circuit, the supplementary firing is used only temporarily in transitional phases.

Preferably, in the case of the method, a gas turbine with sequential combustion is used as the gas turbine since this itself is highly efficient, particularly on partial load.

The solar combined-cycle power station according to the invention comprises a water/steam circuit with a steam turbine and a heat recovery steam generator, through which the hot exhaust gases from a gas turbine flow, wherein heat is additionally supplied to the water/steam circuit from a solar array. The water/steam circuit is designed only for the full load on the gas turbine. A controller is provided for the gas turbine, the controller controls the load on the gas turbine, on the basis of the power additionally fed in from the solar array, such that the total output power of the integrated solar combined-cycle power station remains substantially constant.

In one refinement of the solar combined-cycle power station according to the invention, the gas turbine is a gas turbine with sequential combustion.

Preferably, the water/steam circuit and the solar array are designed such that the output power of the solar combined-cycle power station is the same on the gas turbine and without any additional power from the solar array as at full load on the solar array and only 85-90% of full load on the gas turbine.

In another refinement, the solar array is formed from parabolic groove collectors, and measures are provided to increase the fresh-steam temperature in the water/steam circuit.

DETAILED DESCRIPTION

The invention is concerned with a novel concept for the design of integrated solar combined-cycle power stations, which maximizes the overall efficiency (lowest $CO_2$ emissions per MW), while at the same time minimizing the total costs (minimum cost of electricity CoE).

The essence of the concept is the most efficient utilization of the solar heat and of the fuel (natural gas), in terms of power, efficiency and economic variables. This is achieved by the measures discussed below.

The use of supplementary firing is always avoided during continuous operation. The supplementary firing (34) is at most used temporarily during transitional phases.

The water/steam circuit (20) is designed for a lower peak pressure in the heat recovery steam generator (26) when the load on the gas turbine (11) is 100% (for example for approximately 120 bar or about 75% of the standard full-load pressure). The corresponding operating point is indicated by the reference symbol A in FIG. 3. Overall, this corresponds to a very low level of overdesign. However, generators, shafts, steam turbines, transformers and high-voltage switchpanels are used, that is to say these are not overdesigned.

Figure 3:
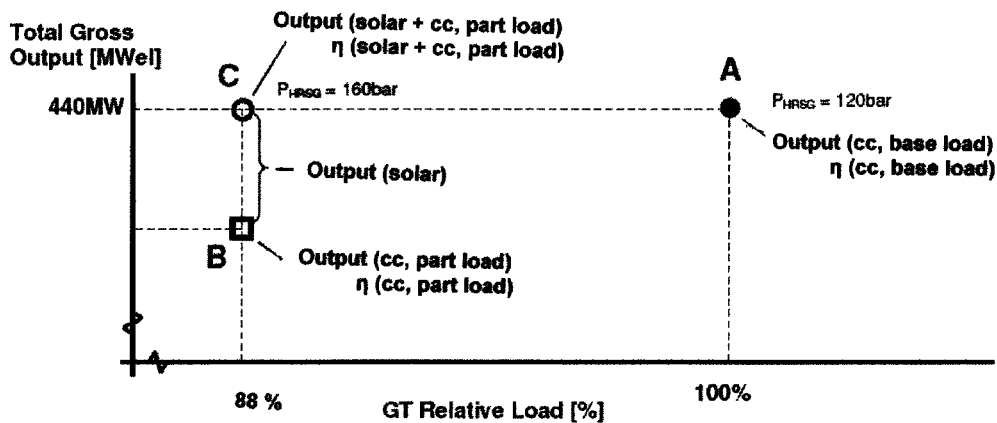
FIG. 3 shows a diagram comparable to FIG. 2, for a method and a power station according to one exemplary embodiment of the invention.

The water/steam circuit (20) as shown in FIG. 3 is designed for 100% solar heat and 85-90% load on the gas turbine. This corresponds to the operating point annotated C in FIG. 3 (which is shown for 88% gas turbine power).

The solar array (33) is not designed for the maximum level, but such that the costs of the electricity generated by solar means are minimized.

The power generated by solar means and the power from the gas turbine/steam turbine combined-cycle power station (CCPS) are set such that this results in an approximately constant output power at full load (the output power is approximately constant between the points C and A in FIG. 3, that is to say the output power of the combined-cycle power station at full-load output (cc, base load) at the point A, the output power of the combined-cycle power station with an integrated solar array output (solar+cc, part load) at point C and the output powers output (solar+cc, part load) at gas-turbine load points between points A and C are approximately the same, as indicated by the dashed line). Changes in the power output produced by solar means (solar) are compensated for by appropriate load changes on the gas turbine. In the extreme (for example at night and without a store), the power station is operated with the gas turbine on 100% load. If the intention is to operate the power station on only partial load, the solar component is maintained to its full extent, and only the power from the gas turbine is reduced. This concept can be referred to as "gas turbine regulation".

The solar full load need not correspond to the maximum possible solar power of the solar array. In fact, it may correspond to the average power achievable during the day. The maximum possible solar power of the solar array is reached only for a limited time period of the total time. Using the mean power as a reference variable, the power station operates closer to its nominal operating point for a longer time period.

The advantage of the concept according to the invention is clear from FIG. 3. A constant output power can always be achieved by simple regulation of the gas turbine.

The overall efficiency varies only slightly as a function of the load on the gas turbine. For example, the efficiency η(cc, part load) at point B is only about 0.1% lower than the efficiency η(cc, base load) at point A. The efficiency of the power station increases when the full solar power is used. For example, the efficiency η(solar+cc, part load) at point C is 6.5% higher than the efficiency η(cc, base load) at point A.

Figure 4:
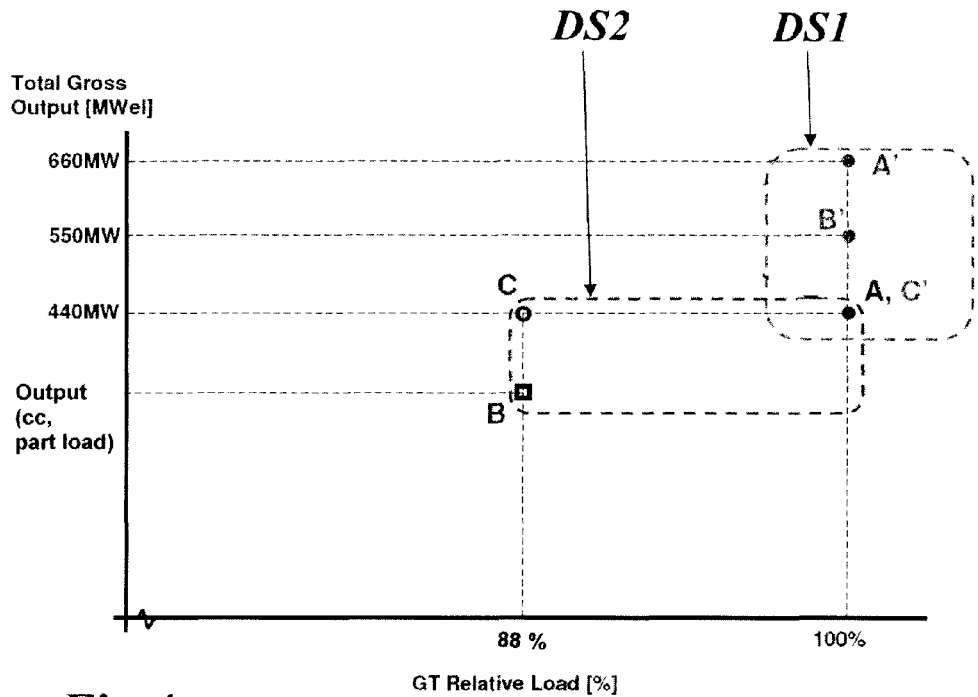
FIG. 4 uses a diagram corresponding to FIG. 2 to show the comparison of the design spaces and operating points as shown in FIGS. 2 and 3.

The advantage of the concept according to the invention becomes even clearer when compared directly with conventional solutions. FIG. 4 shows that although a water/steam circuit of a conventional type is designed for point A' in the design space DS1 (that is to say 100% gas turbine load+100% solar+100% supplementary firing), it in fact operates only at point B' for a considerable proportion of the time (approximately 50%), because of the lack of solar energy. Even if the supplementary firing, which decreases the efficiency, is also ceased, the conventional power station operates at point C', which leads to higher electricity costs because of the higher power station costs.

In contrast, the present invention proposes a design of the power station which covers a narrower output-power range (design space DS2 in FIG. 4), resulting in higher overall efficiencies and lower electricity costs, however.

A further advantage of the novel concept proposed here is that—when using a gas turbine with sequential combustion, as is shown in FIG. 1—the turbine inlet temperature (TIT) downstream from the second combustion chamber (16 in FIG. 1) decreases when the load on the gas turbine is reduced from 100% to 88%. This means that the thermal load on the combustion chamber and on the turbine (17 in FIG. 1) is reduced, and that their service lives are lengthened when, as is shown in FIG. 3, solar heat is introduced increasingly into the process.

Figure 5:
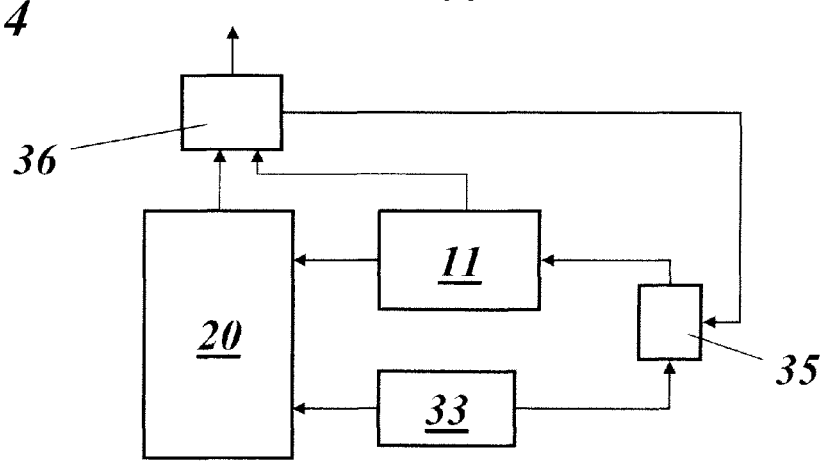
FIG. 5 shows an example of a gas-turbine control system for carrying out the method according to the invention.

FIG. 5 shows an example of a gas turbine control system for carrying out the method according to the invention: the water/steam circuit 20 receives heat both from the gas turbine 11 and from the solar array 33, and emits electrical power at the output. The gas turbine 11, with its generator, likewise generates electrical power. Both powers are measured by a power sensor 36, and the values are passed to a controller 35 for the gas turbine 11. At the same time, the controller 35 receives values of the solar heat produced by the solar array 33, from it. The controller 35 now ensures that, as the solar heat increases, the load on the gas turbine 11 is reduced, and vice versa, with the output power being kept substantially constant overall.

A considerable proportion of the costs which are dependent on the solar generation can be ascribed to the heat exchanger (32 in FIG. 1), which forms the linking element between the solar array and the water/steam circuit. When analyzing the solar electricity costs, that is to say the costs which are incurred by the additional power station parts for solar heat recovery and processing, it must be remembered that, because of the rapidly rising costs for the heat exchanger, the contribution of the solar energy to the integrated solar combined-cycle power station should be limited. This limit is considerably lower than in the case of the solutions proposed in the prior art.

When parabolic groove collectors (37) are used in the solar array (33 in FIG. 1), with thermal oil flowing through the parabolic groove collectors (37) in the solar circuit (30), solar steam can be supplied at a temperature of 380° C. in the high-pressure superheater of the heat recovery steam generator (26). However, in consequence, the temperature of the fresh steam at the inlet to the steam turbine (21) is reduced by more than 80° C., thus reducing the power station efficiency, and increasing the electricity costs. It is therefore advantageous to increase the fresh steam temperature to 580° C. In order to achieve this, the surface area of the high-pressure section of the heat recovery steam generator should be correspondingly enlarged.

It is also advantageous to operate the power station—when gas turbines with sequential combustion are used—in the low load range (Low Load Operational Concept LLOC) during the night. This avoids the consumption of fuel for the generation of electricity when its sale price is low. The output power can then be increased very quickly as soon as solar energy is available again (during the day).

Furthermore, it is also feasible to design the power station for 100% load in the gas turbine/steam turbine combined-cycle power station part plus the additional solar energy ("Solar Boost"). The power station components (generator, shaft, transformers, high-voltage switch panel) are then designed for a higher power.

In addition to gas turbine regulation as shown in FIG. 3, the supplementary firing can also be regulated, with smooth transitions between the two types of regulation.

LIST OF REFERENCE NUMERALS

10 Integrated solar combined-cycle (ISCC) power
11 Gas turbine
12 Air inlet
13a, 13b Compressor
14, 16 Combustion chamber
15, 17 Turbine
18 Shaft
19, 25 Generator
20 Water/steam circuit
21 Steam turbine
22 Condenser
23 Feedwater pump
24 Feedwater boiler
26 Heat recovery steam generator (HRSG)
27 Exhaust gas chimney
28 Connection
29 Exhaust gas line
30 Solar circuit
31 Pump
32 Heat exchanger
33 Solar array
34 Supplementary firing
35 Controller
36 Power sensor
37 Parabolic groove collector
DS1, DS2 Design space

What is claimed is:

1. A method for operating an integrated solar combined-cycle power station, comprising:
    providing a water/steam circuit through which hot exhaust gases from a gas turbine flows, with a steam turbine and a heat recover steam generator included in the water/steam circuit;
    supplying the water/steam circuit directly with each heat from a solar array and the heat of the hot exhaust gases from the gas turbine, with the water/steam circuit operative only for a full load on the gas turbine; and
    reducing the load on the gas turbine based on heat supplied from the solar array directly into the water/steam circuit to such an extent that the total output power of the integrated solar combined-cycle power station remains substantially constant.

2. The method as claimed in claim 1, wherein, when the integrated solar combined-cycle power station run at partial load, heat supplied to the water/steam circuit from the solar array is maintained, and the load on the gas turbine is correspondingly reduced.

3. The method as claimed in claim 1, wherein heat from the solar array operative at full load is supplied into the water/steam circuit.

4. The method as claimed in claim 3, wherein a mean power over the course of a day is drawn from the solar array as the full load on the solar array.

5. The method as claimed in claim 1, wherein supplementary firing is provided for steam generation in the water/steam circuit, and the supplementary firing is used only temporarily in transitional phases.

6. The method as claimed in claim 1, wherein a gas turbine with sequential combustion is used as the gas turbine.

7. An integrated solar combined-cycle power station comprising:
    a water/steam circuit with a steam turbine, a heat recovery steam generator, and hot exhaust gases from a gas turbine flowing through the water/steam circuit;
    a solar array directly configured to the water/steam circuit, wherein heat is supplied to the water/steam circuit directly from the solar array, and heat is supplied to the water/steam circuit from the hot exhaust gases from the gas turbine, with the water/steam circuit operative only for a full load on the gas turbine; and a controller is provided for the gas turbine and the solar array, said controller controls the load on the gas-turbine based on heat supplied the water/steam circuit from the solar array, such that total output power of the integrated solar combined-cycle power station remains substantially constant.

8. The integrated solar combined-cycle power station as claimed in claim 7, wherein the gas turbine is a gas turbine with sequential combustion.

9. The integrated solar combined-cycle power station as claimed in claim 7 wherein the water/steam circuit and the solar array are operative for the total output power of the integrated solar combined-cycle power station the same at full load on the gas turbine without any additional power from the solar array and at full load on the solar array and only 85-90% of full load on the gas turbine.

10. The integrated solar combined-cycle power station as claimed in claim 7, wherein the solar array is formed from parabolic groove collectors to increase the fresh-steam temperature in the water/steam circuit.

\* \* \* \* \*